Patented May 23, 1950

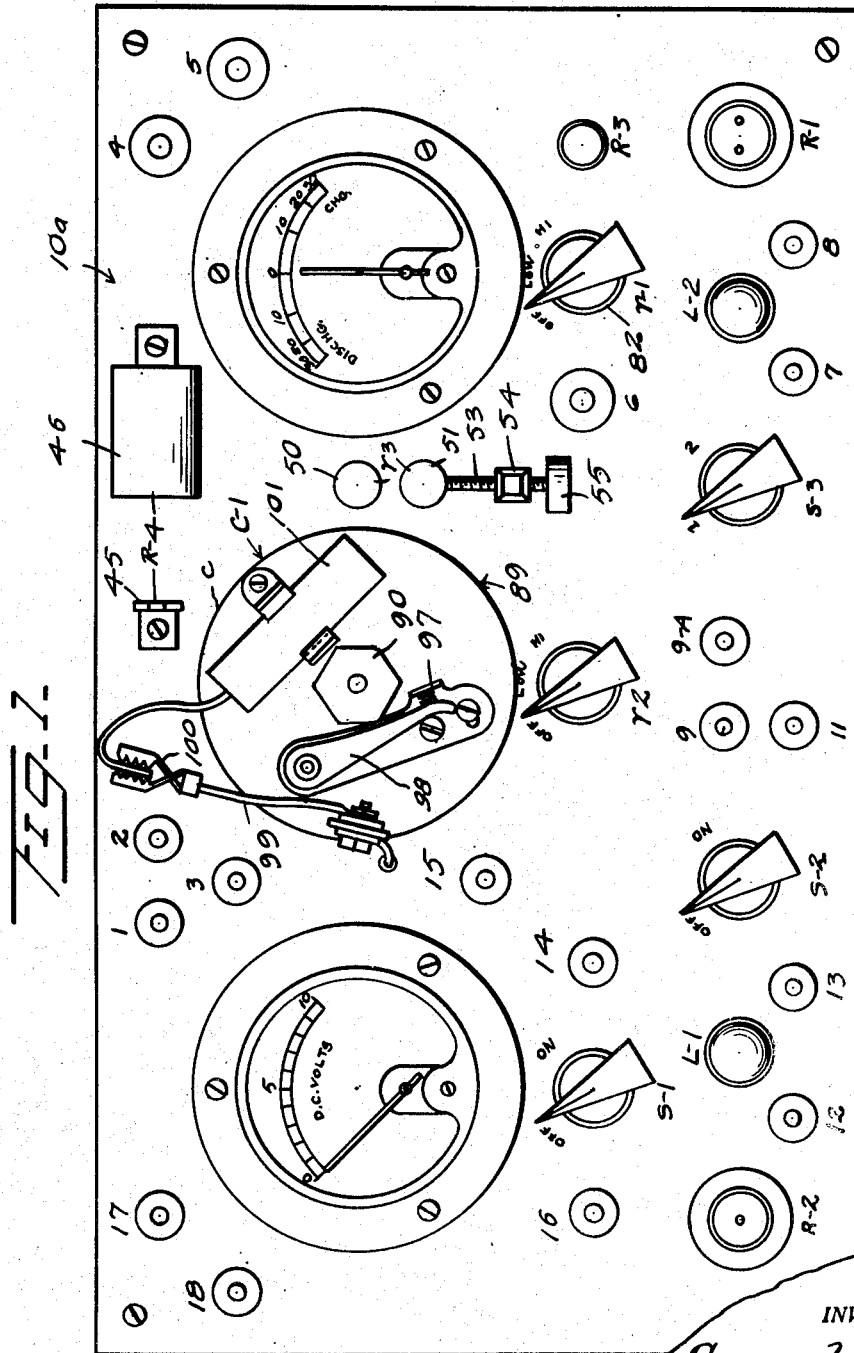

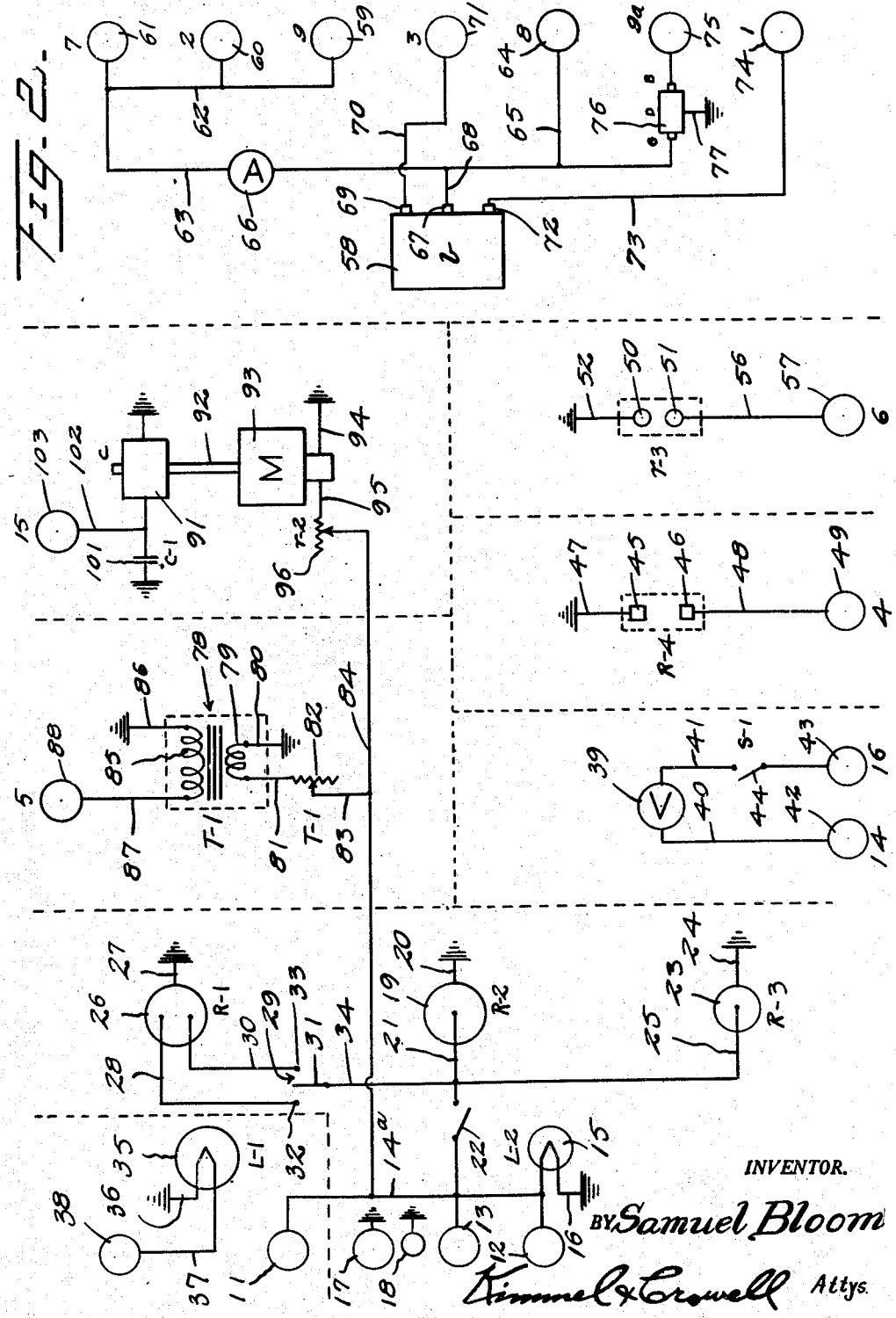

2,508,367

UNITED STATES PATENT OFFICE 2,508,367

TESTING DEVICE

Samuel Bloom, New Brunswick, N. J.

Application October 31, 1946, Serial No. 706,828

1 Claim. (Cl. 175—183)

This invention relates to testing devices for motor vehicles.

An object of this invention is to provide a testing device of this kind which is designed for making a number of tests in the electrical circuits and electrical devices of a motor vehicle so as to locate short circuits, open circuits, to test the efficiency of electrical accessories, and to perform numerous testing operations which require individual instruments or combinations of instruments.

Another object of this invention is to provide a testing unit of this kind which is compact, portable, and light in weight so that it can be placed in or on the vehicle.

To the foregoing objects, and others which may hereinafter more fully appear, the invention consists of the novel construction, combination and arrangement of parts, as will be more specifically referred to and illustrated in the accompanying drawings, but it is to be understood that changes, variations and modifications may be resorted to which fall within the scope of the invention as claimed.

In the drawings,

Figure 1 is a plan view, partly broken away, of a testing device constructed according to an embodiment of this invention; and Figure 2 is a schematic view of the electric circuits embodied in this invention.

Referring to the drawings, the numeral 10a designates generally a panel which is adapted to be mounted on the front or top of a cabinet of suitable size within which the various elements to be hereinafter described are adapted to be positioned. The panel 10a has secured thereto a plurality of sockets 11, 12 and 13, which are connected to a common conductor 14a. A light bulb 15 is connected at one side to the conductor 14a and is connected at the other side by a ground wire 16 to a ground conductor. A pair of ground sockets 17 and 18 are carried by the panel 10a and are connected to the ground, so that one side of an electric supply source may be connected to either one of the sockets 17 or 18 and the other side of the supply source may be connected to one of the sockets 11, 12 or 13.

A light bulb testing socket 19 is carried by the panel 10a being connected at one side, as at 20, to the ground and connected at the other side by means of a conductor 21 to the conductor 14a. A switch 22 is interposed in the conductor 21 between the conductor 14a and the socket 19. The socket 19 is a single pole or center contact and a second single pole or center contact socket 23 is also mounted in the panel 10a. One side of the socket 23 is connected by means of a wire 24 to the ground and the other side of the socket 23 is connected by means of a wire 25 to the wire 21. A double contact socket 26 is carried by the panel 10a, being connected at one side by a wire 27 to the ground and one contact of the socket 26 is connected by means of a wire 28 to a switch 29. The other contact of the socket 26 is connected by means of a wire 30 to the switch 29 which is formed with a movable circuit closing arm 31 engageable with either one of two contacts 32 and 33 which are connected to the conductors 28 and 30 respectively.

The switch arm 31 is connected by a conductor 34 to the wire 21. The panel 10a also has mounted therein a light testing socket 35, which has one side thereof grounded as by a conductor 36, and the other side of the socket 35 is connected by a conductor 37 to a socket 38. In order to provide a means whereby the voltage or output of a generator may be tested, I have provided a voltmeter 39 which is mounted in the panel 10a and is connected by conductors 40 and 41 to sockets 42 and 43 respectively. A switch 44 is interposed in the conductor 41.

In order to provide for the testing of spark plugs, I have provided a cradle comprising spark plug supporting members 45 and 46 within which the spark plug is adapted to be removably mounted. The supporting member 45 is connected by means of a wire 47 to the ground and the supporting member 46 is connected by means of a wire 48 to socket 49. The panel also has mounted on the upper side thereof a pair of electrodes 50 and 51. The electrode 50 is stationary, being connected by means of a wire 52 to the ground, whereas electrode 51 is mounted on a threaded shaft 53 engaging through a stationary nut 54 and the shaft 53 is provided with a knob 55 so that the adjustable electrode 51 may be moved relative to the stationary electrode 50. The nut or supporting member 54 is connected by means of a wire 56 to a socket 57.

In order to provide for testing of either the voltage or the generator cut-out, the panel 10a has mounted rearwardly thereof a conventional voltage regulator 58. The panel 10a has mounted therein a plurality of sockets 59, 60, and 61, which are connected together by a common conductor 62, and the conductor 62 is connected to a conductor 63. A fourth socket 64 is connected by a conductor 65 to the conductor 63, and an ammeter 66 is interposed in the conductor 63. The center terminal 67 of the voltage regulator 58 is connected by a conductor 68 through the conductor 63, and one outer terminal 69 of the voltage regulator 58 is connected by a conductor 70 to a socket 71. A second outer terminal 72 of the voltage regulator is connected by means of a conductor 73 to a socket 74. The conductor 63 is also connected to a socket 75 and a conventional generator cut-out 76 is interposed in the conductor 63, being connected at one side by means of a wire 77 to the ground. In order to provide for testing coils and the like, I have provided a transformer 78 disposed at the rear of the panel 10a which has the primary 79 thereof connected at one side 80 to the ground, and has the other side 81 thereof connected to a rheostat 82. The rheostat 82 is connected by means of a conductor 83 to a conductor 84 which is connected at one end to the conductor 14a.

The secondary 85 of the transformer 78 is connected at one side by means of a wire 86 to the ground and the other side of the secondary 85 is connected by means of a wire 87 to a socket 88. A conventional breaker structure, generally designated as 89, is mounted on the outer side of the panel and includes a rotary cam 90 which is connected through gearing 91 to a motor shaft 92. The shaft 92 is coupled to a motor 93 which has one terminal thereof grounded by means of a wire 94. The other terminal of the motor 93 is connected by means of a wire 95 to a rheostat 96 which is connected to the conductor 84. The distributor assembly 89 includes a stationary breaker point 97 and a spring pressed movable breaker point 98 engageable with the rotary cam 90. A flexible conductor 99, having a clip 100 secured to an end thereof, is connected to the movable contact member 98. The distributor assembly 89 also includes a condenser 101 which is connected to the ground and is also connected to a socket 103.

The assembly hereinbefore described is designed for testing various electrical accessories or parts in the motor vehicle as follows: In order to test the coil in the car, the high tension wire from the coil is connected to socket 57. A conductor from the distributor terminal on the coil is connected to socket 103. A second conductor is connected between the battery terminal on the coil and socket 12. Rheostat 96 is then adjusted to provide for operation of the motor 93 and rotation of cam 90 at the desired speed. A visible spark will be observed between the electrodes 50 and 51 forming the spark gap so that the condition of the coil can be determined by adjustment of the adjustable electrode 51 toward or away from the stationary electrode 50.

A spark plug is tested by removing the plug from the engine and inserting the plug between the plug supporting members 45 and 46. A high tension conductor is then connected between pin sockets 49 and 88. Switch or rheostat 82 is then turned to "on" position whereupon the spark may be observed between the electrodes of the spark plug.

Light bulbs may be tested by inserting the bulb in the sockets 19, 23 or 26. Socket 19 is a large bayonet type socket, whereas socket 23 is a small bayonet type socket. The socket 26 is for use in testing double filament bulbs. With the bulb in the correct socket, either 19, 23, or 26, any one of the sockets 11, 12 or 13 may be connected to one side of a battery, and either one of the ground sockets 17 or 18 may be connected to the other side of the battery. The condition of the bulb in socket 26 can be determined by moving switch arm 31 to either contact 32 or 33. Switch 22 may then be closed, whereupon the condition of the light bulb can be readily observed.

The output of the generator can be checked by removing the generator output wire from the regulator or cut-out, and connecting the output side of the generator with socket 64. A conductor is connected between socket 61 and the cut-out or regulator terminal from which the output wire was removed. The engine may then be operated whereupon the output will be observed on ammeter 66.

The amount of current in any circuit of the vehicle may be tested by connecting sockets 61 and 64 in series with the lead wire being tested. The current in the circuit will be recorded or indicated on ammeter 66.

The continuity of any circuit may be tested by connecting sockets 17 and 38 through conductors across the circuit to be tested. If the circuit is not broken, bulb 35 will be lighted. The high resistance circuits are tested by connecting sockets 11 and 42 together with a jumper wire. Conductors are then connected to sockets 17 and 43. Switch 44 is turned to the "on" position, whereupon the voltmeter will indicate the presence of current in the circuit if the same is not broken.

The voltage regulator is checked by removing the leads from the voltage regulator in the car. A conductor is then connected between socket 71 and the field terminal of the generator. A second conductor is connected between socket 60 and the generator output terminal. A third conductor is connected between socket 74 and the battery. The substitute voltage regulator 58 will be activated by operation of the motor so that the substitute or testing regulator 58 should eliminate the trouble.

The cut-out is checked by disconnecting all leads from the cut-out in the car and then connecting socket 75 to the battery terminal on the cut-out. A conductor is connected between socket 59 and the generator output, and a third conductor is connected between socket 17 and a good ground on the vehicle chassis. The rate of charge of the generator will be noted on the ammeter 66.

The emergency ignition system embodied with this tester may be used by connecting socket 12 to the battery of the car and connecting socket 17 to a good ground on the vehicle chassis. Light bulb 15 should light up when these connections are made. This bulb 15 will light up whenever sockets 11, 12 or 13, and 17 or 18 are connected to a current source. A high tension wire is then connected from socket 88 to the terminal center sleeve on the distributor cap. Rheostat 82 is then turned to the "on" position whereupon the engine should readily start.

In order to read the voltage in any circuit, a pair of conductors are connected at one end thereof to sockets 42 and 43. The other ends of the pair of conductors may be provided with clips, and these clips may be connected across the circuit to be tested. Switch 44 is turned to the "on" position, whereupon voltmeter 39 will indicate the voltage in such circuit.

The exact configuration illustrated is regarded as the optimum, but some of the desirable results inherent in this disclosure may be obtained by various slight modifications including some departure from the exact configuration shown, and it is therefore, requested that the scope of the invention should be regarded as limited only by the terms of the claim.

What I claim is:

A testing device for the electrical accessories of a motor vehicle comprising a panel, a plurality of circuit connecting sockets carried by said panel, a common conductor for said sockets, a plurality of light bulb sockets, a common conductor connecting said light bulb sockets together in parallel and to said first named common conductor, a switch interposed in said second named common conductor, a transformer on said panel, a terminal connected to one side of the secondary of said transformer, spark gap means carried by said panel, a terminal connected to said spark gap means and adapted to be connected to said terminal of said secondary, a meter carried by said panel, a pair of terminals connected to said meter including a switch interposed between one of said terminals and said meter, a voltage regulator, a plurality of terminals connected to said voltage regulator and adapted for connection to the generator of a vehicle, a second meter between said voltage regulator and certain ones of said latter named terminals, said first named meter and said pair of terminals being adapted to be connected in the circuits of said circuit connecting sockets.

SAMUEL BLOOM.

REFERENCES CITED

The following references are of record in the file of this patent:

UNITED STATES PATENTS

| Number | Name | Date |
| --- | --- | --- |
| 1,349,656 | Bierbower | Aug. 17, 1920 |
| 1,363,491 | Buresch | Dec. 28, 1920 |
| 1,433,488 | Smith | Oct. 24, 1922 |
| 1,950,052 | Haskins | Mar. 6, 1934 |

OTHER REFERENCES

Sales Bulletin, Simpson Electric Co., Apr. 1, 1936.